United States Patent
Carver et al.

(10) Patent No.: US 6,777,015 B2
(45) Date of Patent: Aug. 17, 2004

(54) CO-PROCESSED COMPOSITIONS USEFUL AS CULINARY THICKENERS

(75) Inventors: Janet M. Carver, Belle Mead, NJ (US); Norman Edward Collins, Plainsboro, NJ (US); Aaron K. Edwards, Buffalo Grove, IL (US); Joseph P. Eisley, Matawan, NJ (US); Robert C. Kendall, Flemington, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 328 days.

(21) Appl. No.: 10/042,442

(22) Filed: Jan. 8, 2002

(65) Prior Publication Data

US 2003/0039741 A1 Feb. 27, 2003

Related U.S. Application Data

(63) Continuation-in-part of application No. 09/809,968, filed on Mar. 16, 2001, now abandoned.

(51) Int. Cl.$^7$ ............................................. A23L 1/0522
(52) U.S. Cl. ........................ 426/578; 426/637; 426/658; 426/661
(58) Field of Search ................................. 426/637, 578, 426/658, 661; 127/32, 33, 69, 70

(56) References Cited

U.S. PATENT DOCUMENTS

| | | | | |
|---|---|---|---|---|
| 3,554,764 A | | 1/1971 | Yoder et al. | 99/101 |
| 4,428,972 A | * | 1/1984 | Wurzburg et al. | 426/578 |
| 5,165,950 A | | 11/1992 | Boehmer et al. | 426/559 |
| 5,281,432 A | * | 1/1994 | Zallie et al. | 426/549 |
| 5,344,663 A | * | 9/1994 | Jewell et al. | 426/549 |
| 5,849,351 A | * | 12/1998 | Higgins et al. | 426/637 |
| 5,891,496 A | | 4/1999 | Hannah et al. | 426/102 |
| 5,932,017 A | * | 8/1999 | Chiu et al. | 127/67 |
| 5,954,883 A | | 9/1999 | Nagle et al. | 127/36 |
| 5,976,607 A | * | 11/1999 | Higgins et al. | 426/637 |
| 6,221,420 B1 | * | 4/2001 | Thomas et al. | 426/578 |
| 6,231,675 B1 | * | 5/2001 | Chiu et al. | 127/67 |
| 6,451,121 B2 | * | 9/2002 | Chiu et al. | 127/29 |

FOREIGN PATENT DOCUMENTS

| | | |
|---|---|---|
| DD | 255 877 A | 4/1988 |
| WO | WO 96/03891 | 2/1996 |
| WO | WO 01/11994 | 2/2001 |

* cited by examiner

*Primary Examiner*—N. Bhat
(74) *Attorney, Agent, or Firm*—David LeCroy

(57) ABSTRACT

This invention relates to a thickening composition comprising a "co-processed" combination of modified starch and flour. In addition, the invention relates to the process for providing such "ready-for-use" compositions and the improved food products prepared from the co-processed compositions.

26 Claims, No Drawings

CO-PROCESSED COMPOSITIONS USEFUL AS CULINARY THICKENERS

CO-PROCESSED COMPOSITIONS USEFUL AS CULINARY THICKENERS

This application is a Continuation-In-Part ("CIP") of U.S. Ser. No. 09/809,968 filed Mar. 16, 2001 now abandoned.

FIELD OF THE INVENTION

This invention relates to a thickening composition comprising a "co-processed" combination of modified starch and flour. In addition, the invention relates to the process for providing such "ready-for-use" compositions and the improved food products prepared from the co-processed compositions.

BACKGROUND OF THE INVENTION

The use of starches or flours as thickening agents has long been known in the art. Common uses of the starches and/or flours include the thickening of soup mixes or gravies to give body to the product. Starches have also been used as thickeners in processed products in the food industries.

The use of starches, both unmodified and modified, in thickening agents presents long recognized problems, particularly for professionals in the food service industry. Unmodified starch-containing thickeners must be precooked before being used to increase the viscosity of cold or precooked foods. However, the use of a precooked, unmodified starch often imparts an undesirable stringiness to the texture of the food. While the addition of a modified starch can confer a satisfactory texture to cold or precooked foods, these foods do not provide the desirable taste and appearance of foods prepared from thickeners containing modified starches which have been precooked with flour. This is particularly true of foods such as gravies and soups that rely upon the traditional taste and opacity conveyed by an industry standard thickener containing a cooked flour and/or modified starch.

Further, in the food service industry it is often necessary to maintain foods at high temperatures over relatively long periods of time. This is particularly true of thickener-containing foods such as gravies and soups. However, under these conditions an unmodified starch thickener is often unable to maintain a desirable viscosity. Moreover, after cooking and cooling foods containing an unmodified starch thickener, there is often an undesirable separation of fat or absorbed water from a previously homogeneous mix or emulsion. In addition, undesirable weeping and syneresis may occur, particularly after cold storage or freezing and thawing.

While thickeners employing modified starches do not possess these process tolerance limitations inherent to unmodified starches and/or flours, thickeners prepared from modified starches do not have the desirable cooked flour taste and appearance of thickeners prepared from unmodified starches and/or flours. As a result, the use of modified starch thickeners in foods often imparts a "synthetic" appearance as the foods are more translucent and have a glossy shine compared to foods prepared from unmodified starch and/or flour thickeners.

Attempts to overcome the deficiencies of the unmodified starches by using a thickening mixture containing a combination of pregelatinized wheat flour, and/or starch (which may be modified), an edible gum and sodium stearyl fumarate has been reported in U.S. Pat. No. 3,554,764. However, this process requires the undesirable addition of expensive chemicals and requires pregelatinization of the wheat flour component.

According, there is an ongoing need to provide a thickener appropriate for use in the food service industry which combines the desirable properties of a modified starch while imparting the traditional appearance and taste of industry standard thickeners prepared from unmodified starches and flour.

SUMMARY OF THE INVENTION

This invention relates to a thickening composition comprising a "co-processed" combination of modified starch and flour. In addition, the invention relates to the process for providing such "ready-for-use" compositions and the improved food products prepared from the co-processed compositions.

The process comprises blending at least one modified starch, particularly a stabilized and cross-linked or thermally-inhibited starch, with at least one flour, particularly wheat flour, and co-processing the blend. The resultant co-processed compositions may advantageously be used as "ready-for-use" thickeners having superior properties to thickeners prepared with modified or unmodified starches.

The foods prepared from these superior thickeners have improved appearance, taste, process tolerance, emulsification, cold and hot temperature stability and instant viscosity properties compared to foods containing food service industry standard thickeners prepared from modified or unmodified starches.

DETAILED DESCRIPTION OF THE INVENTION

This invention relates to a composition comprising a "co-processed" combination of modified starch and wheat flour having desirable appearance, taste, process tolerance, emulsification, cold and hot temperature stability and instant viscosity properties. In addition, the invention relates to the process for providing such "ready-for-use" compositions and the improved food products prepared from the co-processed compositions.

All starches and flours (hereinafter "starch") may be suitable for use as the base starch herein and may be derived from any native source. The base starch will be subsequently modified unless the base starch is inherently stabilized as described infra, though an inherently stabilized starch may also be subject to subsequent modification. A native starch as used herein, is one as it is found in nature. Also suitable as the base starch are starches and flours derived from a plant obtained by standard breeding techniques including crossbreeding, translocation, inversion, transformation or any other method of gene or chromosome engineering to include variations thereof. In addition, starch or flours derived from a plant grown from artificial mutations and variations of the above generic composition which may be produced by known standard methods of mutation breeding are also suitable for use as the base starch as defined herein.

Typical sources for the base starches which are to be modified are cereals, tubers, roots, legumes and fruits. The native source can be corn, pea, potato, sweet potato, banana, barley, wheat, rice, sago, amaranth, tapioca, arrowroot, canna, sorghum, and waxy or high amylose varieties thereof. Sources of particularly useful base starches are tapioca, dent corn, waxy maize, potato, sago, and rice. A used herein, the term "waxy" is intended to include a starch or flour containing at least about 95% by weight amylopectin and the term "high amylose" is intended to include a starch or flour containing at least about 40% by weight amylose.

Base starches suitable for subsequent modification are also intended to include conversion products derived from any of the starches, including fluidity or thin-boiling starches prepared by oxidation, enzyme conversion, acid hydrolysis, heat and or acid dextrinization, thermal and or sheared products.

Modification of the base starch may be accomplished via a variety of know methods, provided the modification does not destroy the granular nature of the starch. The base starch may be treated by a combination of modifications in any order. As used herein, modified starches are intended to include, without limitation, crosslinked starches, thermally inhibited starches, stabilized starches, acetylated and organically esterified starches, hydroxyethylated and hydroxypropylated starches, phosphorylated and inorganically esterified starches, cationic, anionic, nonionic, and zwitterionic starches, and succinate and substituted succinate derivatives of starch. Such modifications and combinations thereof are known and their preparation are described in the art. See, for example, Whistler, R. L., BeMiller, J. N. and Paschall E. F., Chpt. 9, Sect. 3, *Starch Chemistry and Technology*, $2^{nd}$ Ed., Academic Press, Inc. London, pg 324–349 (1984) and *Modified Starches: Properties and Uses*, Editor: Wurzburg, CRC Press, Inc., Florida (1986). Further, modification by thermal inhibition, described in the family of patents represented by WO 95/04082, which have matured into U.S. Pat. Nos. 5,725,676, 5,932,017 and 6,231,675, the disclosures of which are incorporated herein by reference, is also suitable for use herein.

The term "stabilized starch" is intended to include starches which are substituted on the base starch by monofunctional chemical "blocking groups" and base starches which inherently demonstrate stabilized properties. Accordingly, a base starch which demonstrates inherently stabilized properties is also defined to be a modified starch for the purposes of this application. Foods containing stabilized starches are characterized by the ability to substantially retain their texture (viscosity) and other desirable properties, such as color and clarity, after being frozen and then thawed to room temperature.

Examples of useful monofunctional substituted stabilized starches include, without limitation, starch esters and ethers, including starch acetates, starch octenylsuccinate, starch phosphates, and starch hydroxyalkylates. The preparation and properties of such stabilized starches are known in the art and described, for example, in Whistler R. L., BeMiller J. N., and Paschall E. F., Chpt 9, Sect 5, pg 343–349, *Starch Chemistry and Technology*, $2^{nd}$ Ed, Academic Press, Inc. London (1984) and Whistler R. L. and Daniel J. R., Chpt 3, pg 119, Carbohydrates, *Food Chemistry*, $2^{nd}$ Ed., edited by Fenenma O. R., Marcel Dekker, Inc., NY, (1985).

Starches which are inherently stabilized (demonstrate stabilized properties without monofunctional substitution) include, without limitation, waxy maize starches having at least one recessive sugary-2 allele. An example of such a starch includes waxy maize starch derived from a plant having endosperm tissue which is heterozygous, with either one or two doses, for the recessive sugary-2 allele, described further in U.S. Pat. No. 5,954,883, the disclosure of which is incorporated herein by reference. Another example includes starch derived from a waxy maize plant of a wxsu2 (homozygous) genotype and translocations, inversions, mutants and variants thereof, discussed in U.S. Pat. No. 4,428,972, the disclosure of which is incorporated herein by reference.

Particularly useful modified starches are food quality starches in which the starch is dually modified by "stabilizing" and crosslinking the starch or by "stabilizing" and thermally inhibiting the starch. Especially useful stabilized and crosslinked starches are, for example, hydroxypropylated distarch phosphate, acetylated distarch adipate, and waxy maize starches having at least one recessive sugary-2 allele which are subsequently crosslinked or thermally inhibited.

Particularly useful hydroxypropylated distarch phosphates are those in which the degree of substitution is in the range of from about 3.5% to about 8.8%, preferably from about 5.7% to about 6.7% by weight of the bound propylene oxide on starch; and the degree of crosslinking is from about 0.001% to about 0.04%, preferably from 0.01% to about 0.025% weight of phosphorus oxychloride reagent used to crosslink the starch. Weight percents are by weight of the starch. As used herein, food quality starches are starches which are edible by animals, including human beings.

Flours that are particularly useful for preparing co-processed compositions of the present invention include, without limitation, wheat, tapioca, rye, oat, buckwheat and soybean, especially wheat flour. Particularly useful wheat flours have less than 16% protein content and especially useful wheat flours have less than 10% protein content.

The process for obtaining the co-processed composition of the present invention comprises blending a modified starch with a flour and co-processing the blend. Particularly useful blends are composed of modified starch to flour over a range of weight percent ratios of from about 72:28 to 93:7 starch:flour. Especially useful are starches modified by both crosslinking and stabilizing that are blended with wheat flour in ratios of between about 80:20 to about 90:10 (modified starch:flour).

The blend is then co-processed. Co-processing involves subjecting the blend to a spray-cooking or drum-drying process. Particularly useful spray-cooking processes include the Steam Injection Dual Atomization ("SIDA") process or the spray-cooking process known as the "EK Process" disclosed in U.S. Pat. Nos. 5,131,953, 5,188,674, 5,281,432, 5,318,635, 5,435,851 and 5,571,552, the disclosures of which are incorporated herein by reference. As disclosed in these patents, the EK Process is a continuous coupled process in which a starch slurry is jet-cooked, then conveyed at high temperature to a spray drier, and spray dried. The most particularly useful process is the SIDA process.

The SIDA process is disclosed in U.S. Pat. Nos. 4,600,472 and 4,280,851, the disclosures of which are incorporated herein by reference. Where appropriate small-scale modifications of the SIDA process may be used. Such modifications are known to those of skill in the art, an example of which is presented herein, infra., in Example 1. According to the SIDA process, the blend is initially mixed in an aqueous solvent (e.g. a slurry is formed) at the desired solids level and ratio of modified starch to flour. Typically, the desired solids level is between about 25% and about 43%, preferably between about 30 and about 35% by weight.

The aqueous mixture (e.g. a slurry) is then atomized into an enclosed chamber to form a relatively fine spray which may be uniformly cooked or gelatinized. A heating medium is interjected into the atomized material in the chamber to cook the material. Atomization of the mixture of the blend and aqueous solvent (e.g. slurry) is effectuated in a multi-fluid nozzle through which is conveyed the mixture and steam (the heating medium) is interjected into the atomized material.

After gelatinizing the starch and flour in the atomized material, the gelatinized mixture is transferred to a spray tower and dried, optionally to about a 3% to about a 12% moisture content by weight of the dried mixture.

After being subjected to the spray-cooking or drum-drying process, the processed material may optionally be agglomerated. Agglomeration may be achieved by methods known in the art, including, for instance, via batch or continuous processing. A particularly useful method of agglomeration involves spraying the material recovered from the spray tower with water until the individual particles adhere to one another. The particles are then dried to a moisture content of from about 3% to about 12% by the use of hot air.

The final moisture content of the co-processed material, is from about 3% to about 12%, irregardless of the method used to process the blend.

The co-processed compositions of the present invention demonstrate a combination of desirable appearance, taste, process tolerance, emulsification, cold and hot temperature stability and instant viscosity properties.

One measure of desirable appearance is the relative opacity of the compositions of the present invention as determined by their relative turbidities in comparison to the "plastic" translucent appearance generally conferred by the use of a modified starch. The turbidities of a co-processed composition was compared to the corresponding modified starch (pregelatinized modified waxy maize) and unmodified starch (dent corn starch), each at 4% solids at 22° C. The co-processed composition of the present invention gave a high value of 3775 Nephelometric Turbidity Units ("NTUs"), comparable to the value of the corresponding unmodified starch (2501 NTUs) solution. In contrast, the corresponding modified starch, which is the pregelatinized modified starch component of the co-processed composition, gave a much lower value (824 NTUs), reflecting the relative unsatisfactory translucency of the modified starch solution. The co-processed compositions of the present invention preferably have at least two times the opacity, more preferably three times and especially preferably four times the opacity of the corresponding (pregelatinized) modified starch as measured in NTUs.

The superior process tolerance of the co-processed compositions is demonstrated by their ability to maintain their viscosity at high temperatures over time over a range of pH. For instance, in a conventional Brown sauce held at 71° C. over eight hours at a pH of 6.26, the co-processed composition of the present invention substantially maintained its viscosity, dropping from its peak viscosity by only 20%. By comparison industry standard thickeners containing unmodified starches show at least a 40% drop. In a conventional tomato sauce held over eight hours at a pH of 4.41, the co-processed composition showed only a 9% drop in viscosity compared to the industry standard thickeners which dropped their viscosities by more than 28%.

Further, in addition to not providing good taste in pre-cooked or cold foods, thickeners prepared from corresponding blends of a "non-co-processed" pregelatinized modified starch and flour (said blend containing a "pregelatinized" version of the modified starch component of the corresponding co-processed composition and flour at the same ratios present in the co-processed composition) do not provide the superior process tolerance, emulsification stability and enduring uniformity of mixture that the co-processed compositions do. For example, the co-processed compositions exhibit superior emulsion stability when used in sauces after cooking, and are able to maintain a uniform emulsion more than 24 hours after cooking. In contrast, sauces prepared from a corresponding non-co-processed blend or a modified starch lose their emulsion and begin to separate the fat component of the sauce immediately after cooking. The co-processed compositions also demonstrate superior retention of viscosity in cooked sauces as well as providing an advantageously enduring uniform distribution of the modified starch and flour throughout the composition as compared to the corresponding non-co-processed blend. The ability of the co-processed compositions to resist separation into the component starch and flour during shipping enables the use of these compositions without requiring the extra step of ensuring adequate distribution by re-mixing the blend before use.

Additionally, the co-processed compositions of the present invention exhibit excellent cold temperature stability as demonstrated by superior free/thaw properties. In comparison to industry standard unmodified starch thickeners, the co-processed compositions are the only thickeners able to substantially return to their initial state after four freeze/thaw cycles when used in sauces which cover range of pHs. A substantial return to initial state, as defined herein, indicates a food having a substantially unchanged texture, appearance, and viscosity.

Finally, unlike current industry standard thickeners containing unmodified starch, the co-processed compositions of the present invention give instant viscosity in sauces over a range of pHs, achieving approximately 82% of its peak viscosity in about four minutes. Accordingly, the co-processed compositions function as "ready-for-use" products that other industry standards thickeners cannot provide.

The co-processed compositions of the present invention advantageously combine the superior taste and appearance of unmodified starch-containing thickeners with the process tolerance, emulsification, temperature stability and instant viscosity properties of thickeners containing modified starches.

Foods in which the thickeners prepared from the co-processed composition of the present invention are useful include, without limitation, sauces, gravies, dips, dressings, fillings, cheese sauce, fruit toppings, turnover fillings, marinades, soups, condiments, chowders, relishes, pate, batters, desserts, glazes, vinaigrettes, coatings, frozen entrees, dry mixes, and cream style vegetables.

The following examples are presented to further illustrate and explain the present invention and should not be taken as limiting in any regard. All parts and percentages are given by weight and all temperatures in degrees Celsius (° C.) unless otherwise noted.

EXAMPLES

The following ingredients were used throughout the examples.

Wheat flour commercially available, for example, from General Mills as SOFTASILK® Wheat Flour.

Dent corn starch (also referred to herein as "corn starch") widely commercially available as corn starch.

Arrowroot flour, commercially available, for example, from Neshaminy Valley Natural Foods.

Potato starch, commercially available, for example, from Avebe. (Food Grade Potato Starch)

Tapioca starch, commercially available, for example, from National Starch and Chemical Company. (Tapioca Starch)

Modified starch: a pregelatinized dihydroxypropylated distarch phosphate waxy maize starch stabilized to a degree of from about 5.7% to about 6.7% by weight bound propylene oxide on the starch (by wt % starch), and crosslinked from about 0.01% to about 0.025% by weight of phosphorus oxychloride reagent (by wt % starch) used to crosslink the starch.

Example 1

Process for Preparing the Co-Processed Compositions

Wheat flour (5.0 kg) and starch (28.3 kg, hydroxypropylated distarch phosphate waxy maize starch abilized to a degree of from about 5.7% to about 6.7% by weight bound propylene oxide (by wt % starch) on the starch, and crosslinked from about 0.01% to about 0.025% by weight of phosphorus oxychloride reagnt (by wt % starch) used to crosslink the starch) were mixed slowly with sufficient water in a batch tank (about 170 kg) so that dilatancy does not occur. The resultant slurry was then mechanically agitated with a Lightnin® Mixer to afford a uniform mixture which was then subjected to a small-scale modification of the SIDA spray-cooking process.

A ¼ J system comprising an air atomizing nozzle in combination with air and fluid caps was used to effect the spray cooking. The uniform mixture of the slurry was pumped at 140 psi into the air cap and gelatinized via steam at 135 psi. The resulting gelatinized mixture was then atomized by the resulting steam pressure through orifices in the cap. The atomized mixture was then dried as it dropped through the spray tower (associated with the ¼ J system) with air at a temperature of 236° C. and recovered as a pregelatinized dry powder. The moisture content of such powders was between about 3 to about 12% by weight of the co-processed composition.

The dried mixture was then agglomerated by fluidizing the dried pregelatinized mixture in a fluidized bed at a temperature of 90° C. while spraying water onto the dried mixture until the individual particles adhered to one another and a loose bulk density of 0.18 to 0.35 grams/cc was achieved.

Example 2

Opacity of the Co-Processed Compositions

Solutions of modified starch, unmodified starches (dent corn starch, arrowroot flour, potato starch, tapioca starch, and wheat flour) and the co-processed composition ("CPC") prepared according to Example 1 was mixed in water at 4:00% solids, heated to 85° C. and held at this temperature for ten minutes. The sample was allowed to cool to room temperature (about 22° C.) then heated to 71° C. and their turbidity measured in a Turbidometer (Model 2100 AN, available from HACH Company, set to measure in Nephelometric Turbidity Units ("NTUs") with Ratio mode on) at each temperature. The results are presented below in Table 1.

TABLE 1

Turbidity Measurements

| STARCH | NTU @ 22.22° C.* | NTU @ 71.1° C.* |
|---|---|---|
| CPC | 3775 | 3182 |
| Pregelatinized ("PG") Modified Waxy Maize | 824 | 928 |
| Dent Corn Starch | 2501 | 2006 |
| Arrowroot Flour | 101 | 101 |
| Potato Starch | 88.2 | 64.7 |
| Tapioca Starch | 94.8 | 90.6 |
| Wheat Flour | 8971 | 6601 |

As the data in Table 1 illustrates, the turbidity, which corresponds to opacity, of the co-processed composition ("CPC") was even higher than that of the solution prepared from the corresponding unmodified starch and was desirably more opaque than that of the modified starch.

Example 3

Viscosity Stability of Brown Sauce Formulation

A conventional brown sauce having a pH of 6.25 was formulated from each starch (dent corn starch, wheat flour, CPC prepared according to Example 1, tapioca starch, arrowroot flour, and potato flour) as follows: beef broth: 90.17%, butter 6.20%, starch 2.76%, salt 0.74% and pepper 0.13%. All percentages are weight percents. Each sauce was brought to a rapid boil on the stove top, reduced to a simmer and held for two minutes. A portion of the sauce was then separated off for freeze/thaw testing as described in Example 4, infra. The remaining sauce was placed on a steam table unit and held at 71° C. for eight hours. Viscosity testing was performed every hour. An RVT model Brookfield Viscometer (available from Brookfield Engineering Laboratories, Inc.) was used for viscosity measurements. The Brookfield was set at 20 rpm using spindle 3. All viscosities are reported in centipoise (cps).

TABLE 2

Viscosity of Brown Sauce over 8 Hours at 71° C., pH 6.25

| Sauce Thickener | Initial | 1 hour | 2 hour | 3 hour | 4 hour |
|---|---|---|---|---|---|
| Dent Corn Starch | 400 cps | 300 cps | 250 cps | 250 cps | 250 cps |
| Wheat Flour | 500 cps | 350 cps | 300 cps | 300 cps | 275 cps |
| CPC | 375 cps | 350 cps | 350 cps | 350 cps | 325 cps |
| Tapioca Starch | 160 cps | 160 cps | 140 cps | 90 cps | 70 cps |
| Arrowroot Flour | 140 cps | 110 cps | 110 cps | 90 cps | 60 cps |
| Potato Starch | 420 cps | 400 cps | 400 cps | 390 cps | 320 cps |

| Sauce Thickener | 5 hour | 6 hour | 7 hour | 8 hour | % change |
|---|---|---|---|---|---|
| Dent Corn Starch | 225 cps | 175 cps | 175 cps | 150 cps | 62.50% |
| Wheat Flour | 250 cps | 200 cps | 200 cps | 175 cps | 65.00% |
| CPC | 325 cps | 325 cps | 300 cps | 300 cps | 20.00% |
| Tapioca Starch | 70 cps | 70 cps | 60 cps | 60 cps | 62.50% |
| Arrowroot Flour | 50 cps | 50 cps | 50 cps | 40 cps | 71.43% |
| Potato Starch | 260 cps | 260 cps | 250 cps | 250 cps | 40.48% |

As the data in Table 2 shows, the brown sauce containing the co-processed composition of the present invention ("CPC") was able to maintain its viscosity over eight hours showing only a 20% drop. In comparison, sauces containing an unmodified starch showed at least a 40% drop in viscosity.

Further, the arrowroot flour, potato starch and wheat flour samples all exhibited very poor emulsion stability of the butter in the brown sauce formulation. All three of these samples had complete butter separation at about the two hour time.

Example 4

Viscosity Stability of a Tomato Sauce Formulation

A conventional Tomato Sauce having a pH of 4.41 was formulated from each starch (dent corn starch, wheat flour, CPC prepared according to Example 1, tapioca starch, arrowroot flour, and potato flour) as follows: water 64.63%, tomato paste 30.60%, olive oil 1.97%, starch 1.50% and salt 1.30%. All percentages are weight percents. Each sauce was brought to a rapid boil on the stove top, reduced to a simmer and held for two minutes. A portion of the sauce was then separated off for freeze/thaw testing as described in Example 5, infra. The remaining sauce was placed on a steam table unit and held at 71° C. for eight hours. Viscosity testing was performed every hour. An RVT Brookfield Viscometer was used for viscosity measurements. All viscosities are reported in Centipoise (cps).

TABLE 3

Viscosity of Tomato Sauce over 8 Hours at 71° C., pH 4.41

| Sauce Thickener | Initial (cps) | 1 hour (cps) | 2 hour (cps) | 3 hour (cps) | 4 hour (cps) |
|---|---|---|---|---|---|
| Dent Corn Starch | 2600 | 2350 | 1900 | 1900 | 1850 |
| Wheat Flour | 2800 | 2600 | 2600 | 1850 | 1750 |
| CPC | 3850 | 3800 | 3700 | 3700 | 3600 |
| Tapioca Starch | 3650 | 3400 | 3200 | 3200 | 3000 |
| Arrowroot Flour | 2000 | 1950 | 1700 | 1700 | 1600 |
| Potato Starch | 3150 | 3000 | 2900 | 2700 | 2650 |

| Sauce Thickener | 5 hour (cps) | 6 hour (cps) | 7 hour (cps) | 8 hour (cps) | % change |
|---|---|---|---|---|---|
| Dent Corn Starch | 1800 | 1600 | 1600 | 1450 | 44.23% |
| Wheat Flour | 1700 | 1600 | 1600 | 1400 | 75.86% |
| CPC | 3600 | 3600 | 3600 | 3500 | 9.09% |
| Tapioca Starch | 2950 | 2600 | 2300 | 2000 | 45.21% |
| Potato Starch | 2550 | 2400 | 2400 | 2250 | 28.57% |
| Arrowroot Flour | 1500 | 1300 | 1300 | 1150 | 42.50% |

As the data in Table 3 shows, the tomato sauce containing the co-processed composition of the present invention ("CPC") was able maintain its viscosity over eight hours showing only about a 9% drop. In comparison, sauces prepared from industry standard thickeners containing an unmodified starch showed at least a 28% drop.

Example 5

Freeze/Thaw Testing

The brown and tomato sauces prepared according to Examples 3 and 4, respectively, were placed in 4 ounce jars and frozen for a minimum period of 24 hours. After each cycle of 24 hours, the sample was brought to room temperature (about 22° C.) and evaluated visually. The samples were then heated to 71° C. and evaluated visually. The results are presented in Tables 4 and 5 for the brown sauce and tomato sauce, respectively.

TABLE 4

Brown Sauce Visual Evaluation at 22.22° C.

| Sauce Thickener | Initial | 1 F/T cycle | 2 F/T cycles | 3 F/T cycles | 4 F/T cycles |
|---|---|---|---|---|---|
| CPC | Good opacity, fluid, smooth, uniform | Opaque, fluid, smooth | Opaque, fluid, smooth | Slight fat separation, fluid, slightly more opaque | Slight fat separation, fluid, slightly more opaque |
| Wheat Flour | Slight gel set, slight butter separation | Cuttable gel, opaque, syneresis | Cuttable gel, opaque, syneresis | Cuttable gel, opaque, a lot of syneresis | Cuttable gel, opaque, a lot of syneresis |
| Corn Starch | Slight gel set, uniform | Cuttable gel, opaque, syneresis | Cuttable gel, opaque, syneresis | Cuttable gel, opaque, a lot of syneresis | Cuttable gel, opaque, a lot of syneresis |
| Arrowroot Flour | No opacity, glossy, fluid, slight butter separation | Complete fat separation, grainy, cohesive, fluid and thin with gel pockets | Complete fat separation, grainy, cohesive, fluid and thin with gel pockets | Complete fat separation, grainy, cohesive, fluid and thin with gel pockets | Complete fat separation, grainy, cohesive, fluid and thin with gel pockets |
| Tapioca Starch | No opacity, glossy, fluid, slight butter separation | Complete fat separation, grainy, cohesive, fluid and thin with gel pockets | Complete fat separation, grainy, cohesive, fluid and thin with gel pockets | Complete fat separation, grainy, cohesive, fluid and thin with gel pockets | Complete fat separation, grainy, cohesive, fluid and thin with gel pockets |
| Potato Starch | Slight gel set, no opacity, slight grain | Very opaque, gel pockets, grainy | Very opaque, gel pockets, grainy | Very opaque, gel pockets, grainy | Very opaque, gelled, grainy |

As Table 4 shows, after the first freeze/thaw cycle, only the co-processed composition of the present invention and the arrowroot flour sample returned to their initial state. However, the arrowroot flour sample did not return to its initial state in contrast to the co-processed composition of the present invention which maintained its cold temperature stability for more than 4 freeze/thaw cycles.

TABLE 5

Tomato Sauce Visual Evaluation at 22.22° C.

| Sauce Thickener | Initial | 1 F/T cycle | 2 F/T cycles | 3 F/T cycles | 4 F/T cycles |
|---|---|---|---|---|---|
| CPC | Thick, uniform, fluid | Thick, uniform, fluid | Thick, uniform, fluid | Thick, uniform, fluid | Thick, uniform, fluid |
| Wheat Flour | Slight gel set, slight opacity | Cuttable gel, opaque, syneresis | Cuttable gel, opaque, syneresis | Cuttable gel, opaque, a lot of syneresis | Cuttable gel, opaque, a lot of syneresis |
| Corn Starch | Slight gel set, uniform | Cuttable gel, opaque, syneresis | Cuttable gel, opaque, syneresis | Cuttable gel, opaque, a lot of syneresis | Cuttable gel, opaque, a lot of syneresis |

TABLE 5-continued

Tomato Sauce Visual Evaluation at 22.22° C.

| Sauce Thickener | Initial | 1 F/T cycle | 2 F/T cycles | 3 F/T cycles | 4 F/T cycles |
|---|---|---|---|---|---|
| Arrowroot Flour | Thin, fluid, slightly glossy appearance (overcooked) | Slight gel formation, syneresis | Slight gel formation, syneresis | Slight gel formation, syneresis | Stronger gel set, more syneresis |
| Tapioca Starch | Thin, fluid, slightly glossy appearance (overcooked) | Slight gel formation, syneresis | Slight gel formation, syneresis | Slight gel formation, syneresis | Stronger gel set, more syneresis |
| Potato Starch | Very grainy, thin, overcooked appearance | Gelled, syneresis | Gelled, syneresis | Gelled, syneresis | Cuttable gel, syneresis |

As illustrated in Table 5, only the co-processed thickener of the present invention was able to return to its initial state after more than one freeze/thaw cycle. Advantageously, the co-processed thickener of the tomato sauce maintained its cold temperature stability throughout more than four free/thaw cycles.

Example 6

Instant Viscosity Measurements

Samples of each starch and the co-processed composition (prepared according to Example 1) were tested for their initial viscosity and processing stability during a heating and hold profile. All samples were tested on the Newport Scientific Series 4 Rapid Visco Analyser (RVA). All samples were prepared and tested at 5.00% solids in water and run at pHs of 3.0 and 6.0, by adjusting the pH with a buffer solution. The buffer solution was prepared by mixing 1.5 volumes of solution A with 1.0 volumes of solution B. Solution A was prepared by diluting citric acid monohydrate (210.2 g) in distilled water (1000 ml). Solution B was prepared by diluted tri-sodium citrate, dihydrate in distilled water (1000 ml).

The RVA Configuration Profile was set as follows:

RVA Configuration Profile

| Time | Function | Temp/Speed Value |
|---|---|---|
| 00:00:00 | Temp | 30° C. |
| 00:00:00 | Speed | 560 rpm |
| 00:00:30 | Speed | 160 rpm |
| 00:01:00 | Temp | 30° C. |
| 00:05:00 | Temp | 90° C. |
| 00:15:00 | Temp | 90° C. |

The samples were then heated to 90° C. and held at that temperature for ten minutes. The RVA viscosity data is reported in Table 6.

TABLE 6

RVA Viscosity Data
All results are reported in centipoise (cps)

| Sample | pH | Viscosity @ 30° C. 0 minutes | Viscosity @ 71.1° C. 3 min. 45 sec. | % Peak Achieved @ 71.1° C. | Peak Viscosity | Final Viscosity |
|---|---|---|---|---|---|---|
| CPC | 3.0 | 326 | 549 | 81.82% | 671 | 617 |
| Wheat Flour | 3.0 | 72 | 63 | 35.40% | 178 | 109 |
| Corn Starch | 3.0 | 67 | 61 | 17.23% | 354 | 278 |
| Arrowroot Flour | 3.0 | 74 | 64 | 12.75% | 502 | 142 |
| Potato Starch | 3.0 | 76 | 112 | 15.20% | 737 | 354 |
| Tapioca Starch | 3.0 | 72 | 66 | 11.00% | 599 | 175 |
| CPC | 6.0 | 311 | 453 | 86.62% | 523 | 408 |
| Wheat Flour | 6.0 | 75 | 73 | 51.40% | 142 | 124 |
| Corn Starch | 6.0 | 71 | 67 | 20.74% | 323 | 284 |
| Arrowroot Flour | 6.0 | 71 | 91 | 17.70% | 514 | 279 |
| Potato Starch | 6.0 | 67 | 95 | 8.61% | 1103 | 1021 |
| Tapioca Starch | 6.0 | 64 | 52 | 8.65% | 601 | 365 |

Only the co-processed composition of the present invention ("CPC") advantageously gave instant viscosity at 0 minutes and achieved approximately 82.00% of its peak viscosity by 4 minutes, characterizing it as a "ready-for-use" product. In contrast, none of the other industry standards were able to provide a "ready-for-use" product.

Example 7

Comparison Co-Processed Composition with a Corresponding Non-Co-Processed Blend This example illustrates improved emulsification properties of thickeners prepared from the co-processed composition of the present invention as compared to a corresponding non-co-processed blend.

Three brown sauces were made according to the preparation described in Example 2. In each sauce the starch was either the co-processed composition prepared according to Example 1 ("CPC"), a corresponding dry blend of modified starch and wheat flour (dry blend), or the modified starch alone.

To prepare the corresponding dry blend, amounts of the modified starch and wheat flour were hand mixed in the same ratios as in the CPC composition so that a uniform blend was obtained.

A sample of each brown sauce (100 ml) was placed in a graduated cylinder. The amount of separated fat or ringing was then measured for each sauce immediately after cooking, periodically during the first hour after cooking and 24 hours later.

The sample containing CPC remained uniform and fluid throughout 24 hours, with no separation of the fat in the system. The sample containing the dry blend began to separate within five minutes after cooking the sample, but remained in uniformly distributed pockets of butter throughout the sample. The sample containing only the modified starch began to separate immediately after cooking, forming uniformly distributed pockets of butter throughout the sample, which ultimately formed a ring of 8 ml of butter that solidified on the surface of the sauce.

This experiment demonstrated that the CPC compositions of the present invention advantageously provided a superior sauce wherein the component fat of the sauce formulation remained emulsified more than 24 hours after cooking.

What is claimed is:

1. A co-processed cooked modified starch/flour composition having a greater weight percentage of modified starch than flour.

2. The co-processed composition of claim 1 wherein the modified starch is a stabilized starch.

3. The co-processed composition of claim 2 wherein the stabilized starch is a monofunctional substituted starch.

4. The co-processed composition of claim 2 wherein the stabilized starch is derived from a waxy maize plant having at least one recessive sugary-2 allele.

5. The co-processed composition of claim 1 wherein the modified starch is inhibited.

6. The co-processed composition of claim 1 wherein the modified starch is a hydroxyalkylated distarch phosphate or an acetylated distarch adipate.

7. The co-processed composition of claim 1 wherein the flour is a wheat flour having a protein content of less than 16%.

8. The co-processed composition of claim 7 wherein the flour is a wheat flour having a protein content of less than 10%.

9. The co-processed composition of claim 1 wherein the starch and the flour are present in a ratio of from about 72:28 to about 93:7 by weight, respectively.

10. The co-processed composition of claim 9 wherein the starch and the flour are present in a ratio of from about 80:20 to about 90:10 by weight, respectively.

11. The co-processed composition according of claim 1 wherein the modified starch is a dihydroxypropylated distarch phosphate waxy maize starch substituted to a degree of from about 5.7% to about 6.7% by weight of propylene oxide reagent used to stabilize the starch, and substituted from about 0.01% to about 0.025% by weight of phosphorus oxychloride reagent used to crosslink the starch and the flour is a wheat flour having a 10% protein content, said starch and flour are present in a ratio of 85:15 (wt % starch:flour) co-processed via the SIDA process.

12. The co-processed composition of claim 1 wherein the modified starch is a chemically modified starch.

13. The co-processed composition of claim 1 having at least two times the opacity of a corresponding modified starch as measured in NTUs.

14. The co-processed composition of claim 1 having emulsion stability over a 24 hour period versus a similar non-co-processed modified starch/flour composition, wherein the starch and flour in the non-co-processed composition are added in the same ratio as the starch and flour in the non-co-processed composition, and wherein the non-co-processed composition exhibits no emulsion stability over the 24 hour period.

15. The co-processed composition of claim 1 having instant viscosity in food products, wherein the co-processed composition attains at least 80% of its peak viscosity in less than four minutes.

16. The co-processed composition of claim 1 wherein the composition maintains freeze/thaw stability over more than one freeze/thaw cycle.

17. A food product comprising the co-processed composition of claim 1.

18. A process for preparing a modified starch/flour composition comprising the steps of:

mixing a modified starch with a flour to form a starch/flour blend, cooking the starch/flour blend to produce a cooked homogeneous modified starch/flour composition, and drying the co-processed composition to a powder, wherein the weight ratio of starch is greater than the weight ratio of flour.

19. The process of claim 18 wherein the starch and flour are mixed in a solvent to form a slurry.

20. The process of claim 19 further comprising the step of atomizing the cooked starch/flour slurry thereby forming the co-processed starch/flour composition.

21. The process of claim 20 wherein the cooked starch/flour composition is gelatinized.

22. The process of claim 18 further comprising the step of agglomerating the dried co-processed composition.

23. The process of claim 18 wherein the cooking is performed by spray cooking or drum-drying the blend.

24. The process of claim 23 wherein the cooking is performed by spray cooking.

25. The process of claim 24 wherein the spray cooking is performed by steam injection dual atomization ("SIDA").

26. The process of claim 18 wherein the cooking further comprises jet cooking the starch/flour blend and spray drying the jet cooked blend.

* * * * *